United States Patent
Moberg et al.

(10) Patent No.: US 6,697,872 B1
(45) Date of Patent: Feb. 24, 2004

(54) DISTRIBUTED PACKET PROCESSING USING ENCAPSULATION AND DECAPSULATION CHAINS

(75) Inventors: Kenneth Moberg, Boulder Creek, CA (US); Kristen Marie Robins, San Jose, CA (US); William May, Sunnyvale, CA (US)

(73) Assignee: Cisco Technology, San Jose, CA (US)

( * ) Notice: Subject to any disclaimer, the term of this patent is extended or adjusted under 35 U.S.C. 154(b) by 0 days.

(21) Appl. No.: 09/418,723

(22) Filed: Oct. 15, 1999

(51) Int. Cl.[7] .............. G06F 15/16; G06F 15/173; H04L 12/28; H04Q 11/00
(52) U.S. Cl. ............ 709/238; 709/236; 709/244; 370/351; 370/384; 370/388; 370/464; 340/825.52
(58) Field of Search ............... 709/238, 230, 709/236, 244; 370/351, 464, 360, 384, 388–389, 392; 340/825.52

(56) References Cited

U.S. PATENT DOCUMENTS

| | | | | |
|---|---|---|---|---|
| 5,267,239 | A | | 11/1993 | Pospischil et al. ........ 370/112 |
| 5,485,460 | A | * | 1/1996 | Schrier et al. ............. 709/227 |
| 5,745,758 | A | | 4/1998 | Shaw et al. ............... 395/672 |
| 5,764,920 | A | * | 6/1998 | Cook et al. ........... 395/200.68 |
| 5,867,666 | A | * | 2/1999 | Harvey ..................... 709/239 |
| 5,920,705 | A | * | 7/1999 | Lyon et al. ............... 709/240 |
| 5,946,467 | A | * | 8/1999 | Pathakis et al. .......... 709/236 |
| 5,982,783 | A | * | 11/1999 | Frey et al. .............. 370/395.6 |
| 5,983,269 | A | * | 11/1999 | Mattson et al. ........... 709/221 |
| 6,092,110 | A | * | 7/2000 | Maria et al. .............. 709/225 |
| 6,160,811 | A | * | 12/2000 | Partridge et al. ......... 370/401 |
| 6,219,706 | B1 | * | 4/2001 | Fan et al. ................ 709/225 |
| 6,226,267 | B1 | | 5/2001 | Spinney et al. ........... 370/235 |
| 6,236,660 | B1 | | 5/2001 | Heuer ...................... 370/409 |
| 6,240,084 | B1 | * | 5/2001 | Oran et al. ............... 370/352 |
| 6,320,848 | B1 | | 11/2001 | Edwards et al. ........... 370/255 |
| 6,385,194 | B2 | | 5/2002 | Surprenant et al. ........ 370/353 |
| 6,389,479 | B1 | * | 5/2002 | Boucher et al. ........... 709/243 |
| 6,421,730 | B1 | * | 7/2002 | Narad et al. .............. 709/236 |
| 6,438,123 | B1 | * | 8/2002 | Chapman ................... 370/351 |
| 6,449,251 | B1 | * | 9/2002 | Awadallah et al. ........ 370/229 |
| 6,452,915 | B1 | * | 9/2002 | Jorgensen ................. 370/338 |
| 6,519,636 | B2 | * | 2/2003 | Engel et al. .............. 709/223 |
| 6,560,630 | B1 | * | 5/2003 | Vepa et al. ............... 709/105 |
| 6,578,084 | B1 | * | 6/2003 | Moberg et al. ............ 709/236 |

OTHER PUBLICATIONS

Patridge, C. et al. "A 50–Gb/s IP Router", IEEE/ACM Transactions on Networking, vol. 6, No. 3, Jun. 1998, pp. 237–248.*

Partridge, Craig, et al. "A 50–Gb/s IP Router", IEEE/ACM Transacitons on Networking, vol. 6, No. 3, Jun. 1998, pp. 237–248.*

Robert Morris, Eddie Kohler, John Jannotti, and M. Frans Kaashoek, In the Proceedings of the 17th ACM Symposium on Operating Systems Principles (SOSP '99), Kiawah Island, South Carolina, Dec. 1999, pp. 217–231.

* cited by examiner

Primary Examiner—Rupal Dharia
Assistant Examiner—Melvin H. Pollack
(74) Attorney, Agent, or Firm—Ritter, Lang & Kaplan LLP (57) ABSTRACT

A method for processing packets includes specifying a primary chain of function elements on a primary processor and specifying a secondary chain of function elements on a secondary processor. Each element is operable to perform an operation on a packet. The method further includes selecting one of the primary processor, secondary processor, and combination of the primary and secondary processors to perform a packet-processing function of each element. The packets are processed by walking through the elements on at least one of the primary and secondary chains. A router having a primary and secondary processor is also disclosed. The primary and secondary processors each include a chain generator for generating primary and secondary chains of function elements. Each of the function elements of the primary chain corresponds to one of the function elements of the secondary chain to form a pair of function elements. At least one function element of each pair is configured to perform a packet-processing function.

33 Claims, 7 Drawing Sheets

DISTRIBUTED PACKET PROCESSING USING ENCAPSULATION AND DECAPSULATION CHAINS

RELATED APPLICATIONS

The present application is related to U.S. patent application Ser. No. 09/418,781 "Packet Processing Using Non-Sequential Encapsulation and De-Capsulation Chains", Ser. No. 09/419,035 "Packet Processing Using Encapsulation and De-Capsulation Chains" U.S. Pat. No. 6,578,084 and 09/864,088 "Dynamically Building Encapsulation And De-Capsulation Chains At Run Time".

BACKGROUND OF THE INVENTION

The present invention relates generally to computer networks, and more particularly, to processing packets within a network.

A network is typically a data communication system which links two or more computers and peripheral devices to allow a user on a computer to access resources and exchange messages with users on other computers. Internetworking is the process of establishing and maintaining communications between and transferring data among multiple local networks in a distributed network system. The network allows users to share resources on their own systems with other network users and to access information on centrally located systems or on systems which are located at remote offices.

A network system typically includes a plurality of routing domains which are each collections of networks under a common administration which share a common routing strategy. Each routing domain includes one or more local networks which are attached to one or more routers. The local network in a routing domain may be a local area network (LAN), metropolitan area network (MAN), or wide area network (WAN), for example. The system includes source and destination nodes (end systems) which are typically computers (e.g., workstations and servers) but may be any type of device which includes a network interface card (NIC).

The routers within the routing domain manage communications among local networks within their domain and communicate with each other using an intradomain routing protocol. The routers transfer information to and from the end systems and among themselves along communication links in formatted packets. When an originating end system wants to transmit information to a destination end system, it generates a packet header in an appropriate format which includes the address of the destination end system, and then fills the remainder of the packet with the information to be transmitted. When a router receives a data packet, it reads the packet's destination address from the packet header and then transmits the packet on the link leading most directly to the packet's destination. Along the path from source to destination, the packet may be transmitted over several links and pass through several routers.

The routers typically utilize three layers (physical, data link, and network) of an OSI protocol stack to forward data packets to the next router or destination end node. The protocol stacks are physically connected through communication channels at the physical layer. The physical layer is directed to the physical and electrical specifications of a physical link, such as a bus which couples the computers of a network to one another. It controls bit transmissions through the link so that a series of bits of a data packet can be communicated from one computer on the network to another computer on the network. The physical layer transmits a raw data bit stream over a communication channel, while the data link layer manipulates the bit stream and transforms it into a data stream. The data link layer is directed to the packaging or framing of bits received in a data transmission into a defined packet which is free of transmission errors. It creates and recognizes boundaries between bits to define bit fields. The data link layer also ensures orderly coordination of the use of shared media, and handles addressing when multiple systems are reachable.

The network layer enables any pair of systems in the network, such as a source node and a destination node, to communicate with each other. The network layer is directed to the control of routing information required to direct a message from a source computer to a destination computer of the network. Also included in the OSI protocol stack is a transport layer, session layer, presentation layer, and application layer.

Data transmission over the internetwork consists of generating data in, for example, a sending process executing on the source node, and passing that data to the application layer and down through the layers of the protocol stack where the data is sequentially formatted as a packet for delivery onto the channel as bits. Those packet bits are then transmitted to the protocol stacks of the routers, and finally to the stack of the destination node, where they are passed up to a receiving process.

Routers are typically configured to handle either a single protocol such as Transmission Control Protocol/internet Protocol (TCP/IP), or multiple protocols. Packets are routed across routers configured for different protocols by using encapsulation, which is the insertion of one protocol's packet into another protocol's packet. For example, it is possible to encapsulate NetWare Internetworking Packet Exchange (IPX) packets into TCP/IP packets and transmit them over a TCP/IP network. The routers are used to decapsulate and encapsulate the packets.

As can be observed from the foregoing, a central processing unit of the router must perform a large number of functions, in addition to performing routing functions. Processing of the additional functions reduces the time available for routing calculations and related functions.

Furthermore, the router software is not easily modified to add new protocols and features. Each time a new protocol is added, the code must be modified to handle the new protocol.

There is, therefore, a need for a router which allows for the updating of router features and protocol without affecting existing software and which can distribute the handling of packets over multiprocessors to provide more efficient performance of routing calculations.

SUMMARY OF THE INVENTION

A router and method for processing packets are disclosed. The router distributes the handling of packet operations between a primary processor and one or more secondary processors to provide for quicker routing calculations on the primary processor. The packet operations are logically separated into chain elements which are then dynamically chained together as needed at runtime, to form encapsulation and decapsulation chains. The chains allow for new chain elements to be inserted into existing chains without changing existing code to introduce new features.

A method for processing packets generally comprises building a primary chain of function elements on a primary processor and a secondary chain of function elements on a secondary processor. Each element is operable to perform an operation on a packet. The method further comprises selecting one of the primary processor, secondary processor, and combination of the primary and secondary processors to perform a packet-processing function of each of the elements. The packets are processed by walking through the elements on the primary and secondary chains.

Each of the function elements in the primary chain may correspond to one of the function elements in the secondary chain to form function element pairs. The operation of one function element of the pair may be to pass the packet to the other processor, while the operation of the other function element may be to perform the packet-processing.

A router of the present invention includes a primary processor having a first chain generator operable to generate a primary chain of function elements and a secondary processor having a second generator operable to generate a secondary chain of function elements. Each function element is capable of performing an operation on a packet. Each of the function elements of the primary chain corresponds to one of the function elements of the secondary chain to form a pair of function elements. At least one function element of each pair is configured to perform a packet processing function.

The primary processor may be a route processor and the secondary processor may be a line card processor. The router may also include more than one line card processor.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

Figure 1:
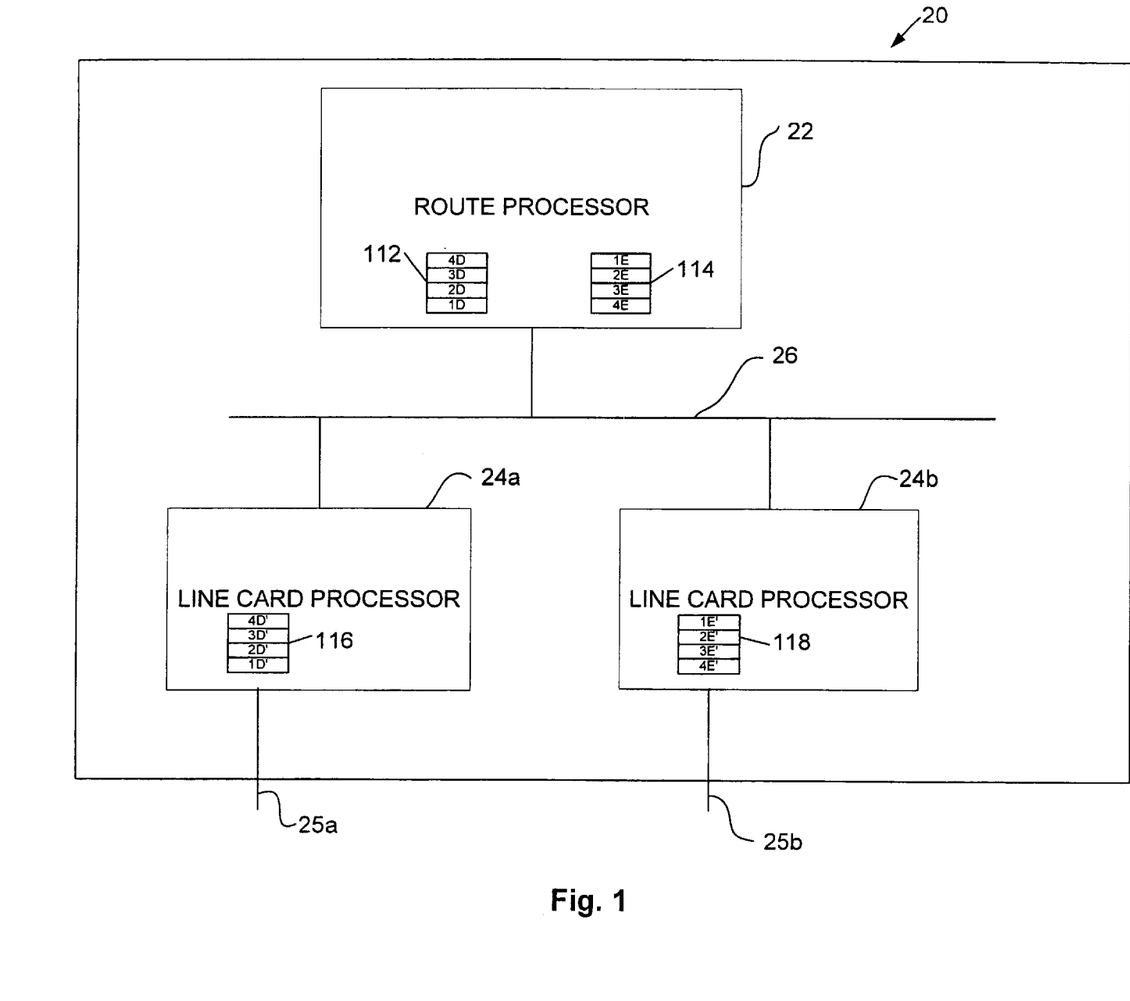
FIG. 1 is a schematic of a router of the present invention.

Referring now to the drawings, and first to FIG. 1, a router of the present invention is generally indicated at 20. The router 20 interconnects networks over local or wide areas and provides traffic control and filtering functions between two or more end-points on the network. The router 20 examines address information in a packet and sends the packet and data contained within the packet along one or more predetermined paths over data communication links to its destinations. The data exchanged between devices may be messages and commands (e.g., request for service), control codes for managing the session (e.g., codes which indicate communication errors and the need for retransmission) or data (e.g., contents of a file). As described below, the router is also used for encapsulation and decapsulation of packets to allow for the transfer of packets between networks with different protocols.

Addressing information contained within the packet is used by the router 20 as the packet traverses a network to direct the packet to its destination. The router 20 maintains tables of adjacent routers and LANs on the network. When the router 20 receives the packet, it looks at these tables to see if it can send the packet directly to the destination specified in the packet. If the packet cannot be sent directly to its destination, the router 20 determines the location of another router which can forward the packet to its destination. If the packet is addressed to the router 20 itself, the router evaluates the remaining information in the packet. If the packet is for a destination on the same network, the router forwards it from one or more of its interfaces. If the router 20 does not know a path or cannot find the destination address of a packet in its routing table, it discards the packet and may return an error message to the source. If the packet contains information about the number of hops it has made on the network, the router 20 may discard the packet if it exceeds a certain hop count.

In order for the router 20 to accomplish these and other functions, significant processing time is required. As further described below, the router 20 of the present invention can distribute some of the functions typically performed by a route processor to intelligent line cards to free up the route processor from packet forwarding and related functions. Since more central processor unit (CPU) power (i.e., processing cycles) is available for the route processor, routing calculations may be performed more quickly.

As shown in FIG. 1, the router 20 includes a master central processing unit (route or primary processor) 22, interfaces 25a, 25b provided as interface cards (line cards), and a bus structure (e.g., PCI bus) 26 connecting the line cards and route processor. The interfaces 25a, 25b are configured to provide physical and data link functionality according to a network with which the particular line interface is coupled and may include ports suitable for communication with appropriate media.

The line cards control the sending and receiving of data packets over the network and may support other peripherals used with the router 20. The line cards include independent line card processors 24a, 24b (secondary processors) and may include memory such as volatile RAM. The line card processors 24a, 24b perform processing of data packets received at or to be transmitted from the line card. For example, the line card processor 24a receives a packet from interface 25a and examines the network address contained in the header of the packet to determine whether the line card or the route processor should be utilized to transmit the data packet for continued routing within the computer network. The processor 24a can also examine the entire packet to verify its validity and determine how to handle certain options provided by the protocol being used to transmit the packet. In this example, the received data packet is destined for another network device off of interface 25b and so the packet is transferred to processor 24b of the transmitting line card for possible further processing and eventual transmission out line interface 25b. Each line card processor 24a, 24b will process data packets that are received from other processors or are to be communicated to other processors to complete the transmission of the data packets through the router 20 provided by the multiprocessor computer system. It is to be understood that line card processors 24a and 24b can each be either a transmitter or receiver, and the above description is provided as an example for purposes of explanation.

The handling of data packets may be distributed between the route processor 22 and line cards 24a, 24b. The route processor 22 is typically responsible for tasks such as routing table computations and network management. For example, the route processor may perform table lookup functions of routing tables and the building and maintaining of a routing table in response to routing topologies received from another source. In addition to route processing, Telnet sessions and network management requests may also be serviced by the route processor. If the packet is a routing protocol or other packet which is to be terminated at the router, the packet is preferably processed at the route processor 22. The line card processors 24a, 24b may perform functions such as route caching, packet switching, media control and management, ICMP (internet control message protocol), and keep-alives, for example. By distributing tasks between the route processor 22 and the line card processors 24a, 24b, the route processor 22 can more efficiently perform routing computations, network diagnostics, and security functions.

Figure 2:
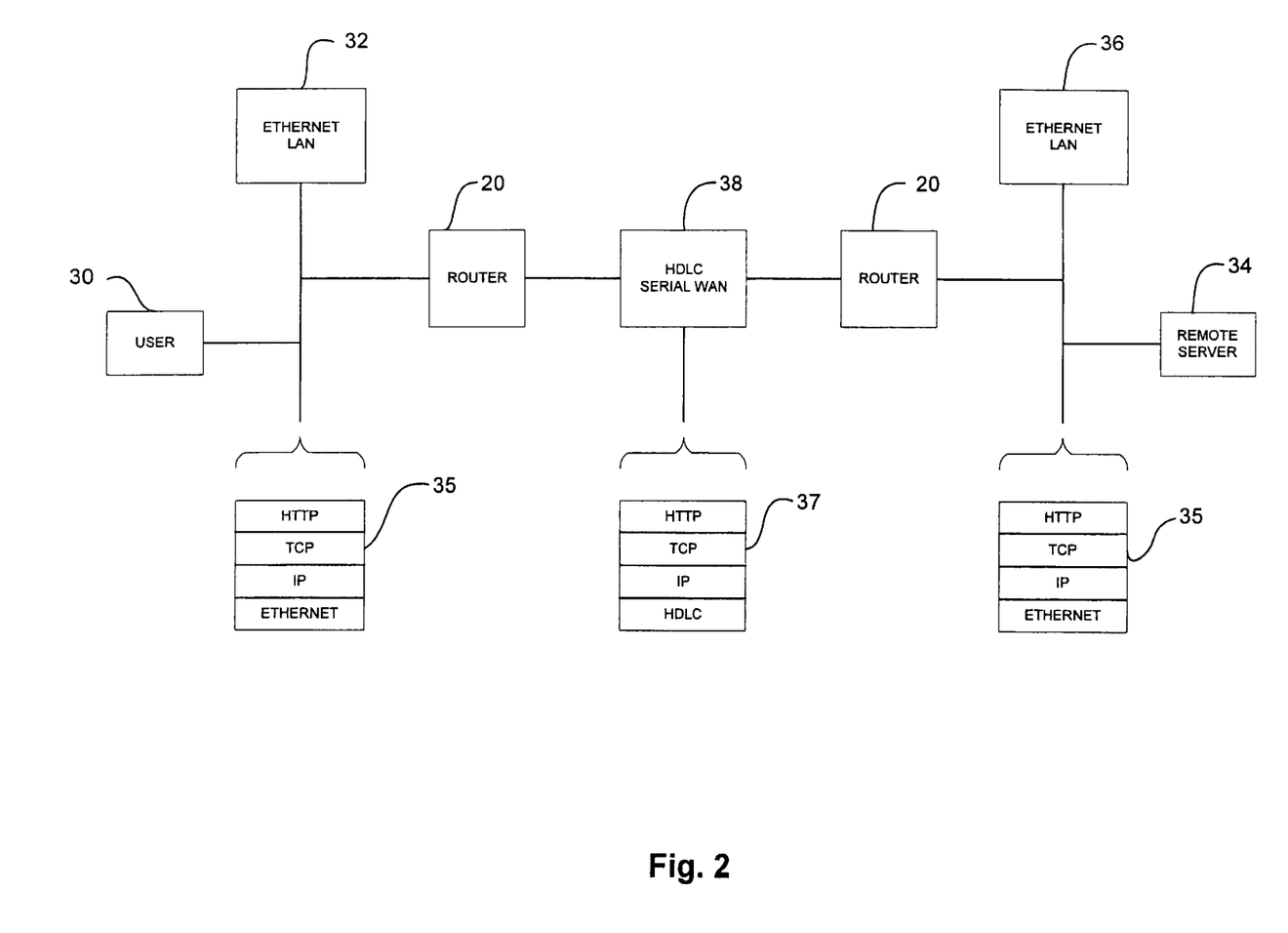
FIG. 2 is a schematic of a network utilizing the router of FIG. 1 to connect a user with a remote server.

FIG. 2 illustrates an example of two routers 20 configured to interconnect two different networks. Routers 20 interconnect a user 30 on one Ethernet local area network (LAN) 32 with a remote server 34 on a different Ethernet LAN 36 with a serial wide area network (WAN) 38 using HDLC (High-level Data Link Control) to connect the two LANs. The Ethernet LANs 32, 36 use Ethernet protocol (block 35), while the serial WAN 38 uses HDLC protocol (block 37). In order for a TCP packet from user 30 to reach the server 34, the routers 20 must translate packets from the Ethernet protocol to HDLC protocol and back to the Ethernet protocol. Encapsulation is required since at least one of the paths followed by the packet passes through a network which is not capable in the protocol of the user data packet sent from user 30.

Figure 3:
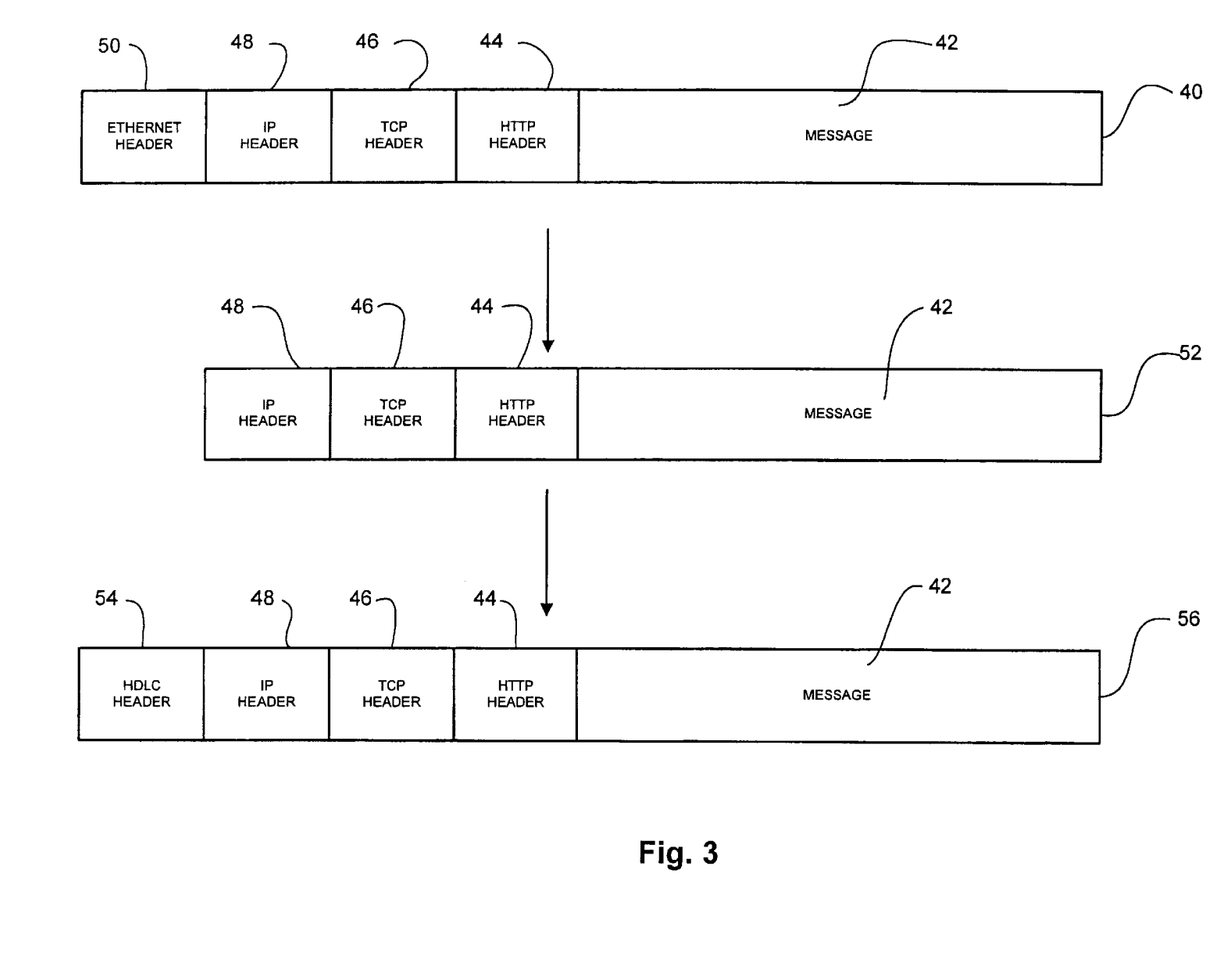
FIG. 3 is a schematic illustrating decapsulation and encapsulation performed by the router of FIG. 1.

FIG. 3 illustrates basic decapsulation and encapsulation performed by router 20. An incoming packet 40 contains a message or other data 42 which is encapsulated with an HTTP header 44 which in turn is encapsulated with a TCP header 46. This in turn is encapsulated with an IP header 48 and the packet is finally encapsulated in an Ethernet frame, including an Ethernet header 50. The router 20 reformats and readdresses the packet by stripping off the Ethernet header 50, or decapsulating the frame, and reading the IP header 48 to obtain a destination address to form the packet as shown at 52. The router 20 next prepends the packet with an HDLC header 54 to encapsulate the message in an HDLC packet format as shown at 56.

Figure 4:
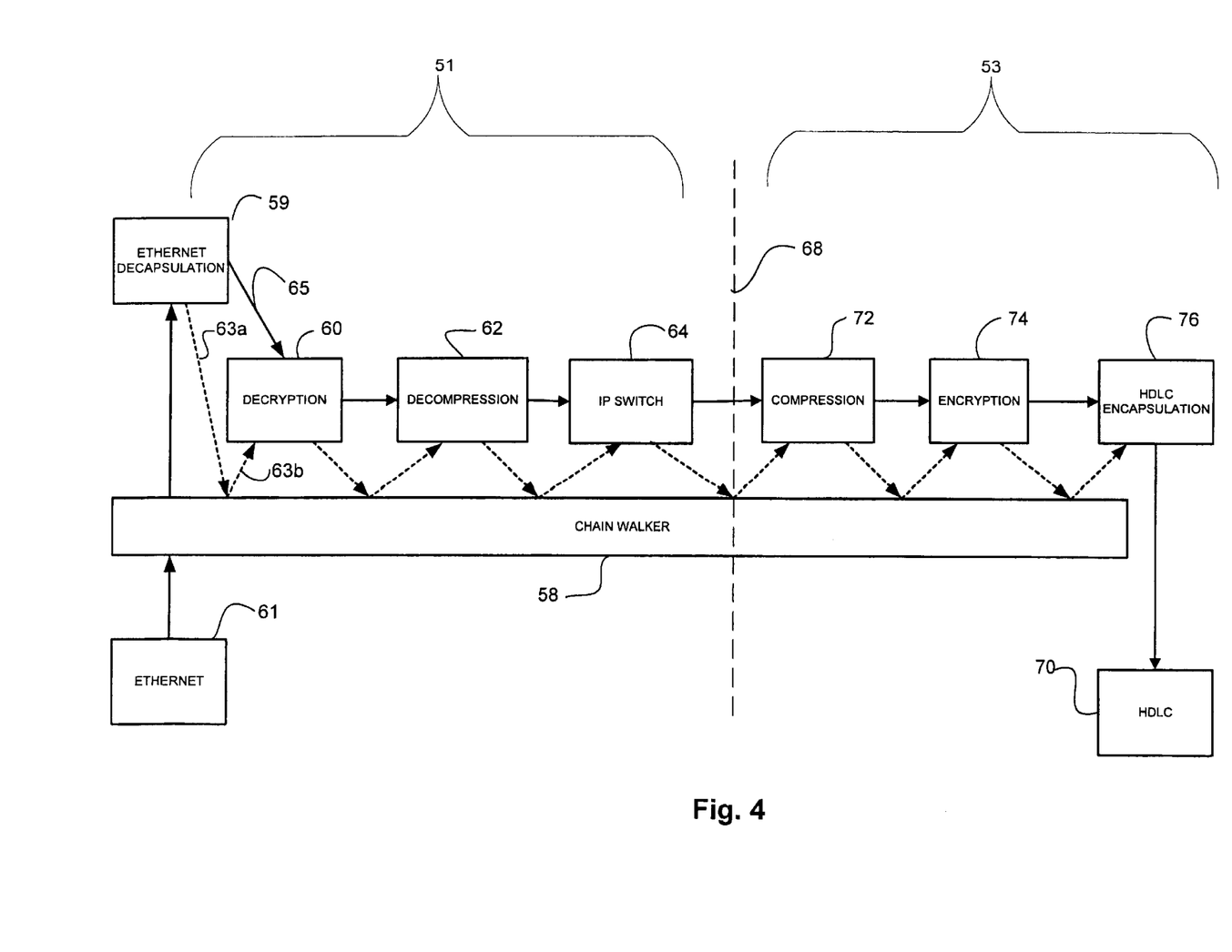
FIG. 4 is a schematic illustrating a chain walker used to process packets in the router of FIG. 1.

The router 20 preferably uses chains to process the packets, as described in U.S. patent application Ser. Nos. 09/419,035 and 09/418,781 (Attorney Docket Nos. CIS 1273 and CIS 1272), entitled "Picket Processing Using Encapsulation and Decapsulation Chains" and "Packet Processing Using Non-Sequential Encapsulation and Decapsulation Chains" respectively, by Moberg et al., filed Oct. 15, 1999, which are incorporated herein by reference. The decapsulation and encapsulation processes may include compression, encryption, and other functions which are broken down into individual elements and dynamically chained together using a chain linked structure (FIG. 4). The various packet operations are logically separated into chain elements or nodes (function elements).

As shown in FIG. 1, the route processor 22 includes a decapsulation chain 112 having chain elements 1D–4D and encapsulation chain 114 having chain elements 1E–4E, line card processor 24a includes a decapsulation chain 116 having chain elements 1D'–4D', and line card processor 24b includes an encapsulation chain 118 having chain elements 1E'–4E'. The decapsulation chain 116 of line card processor 24a corresponds to ("shadows") the decapsulation chain 112 of route processor 22, and the encapsulation chain 118 of line card processor 24b corresponds to ("shadows") the chain element 114 of the route processor. The corresponding elements form function element pairs (i.e., 1D and 1D'). The elements of the function element pair generally correspond structurally (i.e., there is a one-to-one correspondence between the elements of each chain), however, functions performed by corresponding chain elements may differ (i.e., the operation performed by element 1D' may be different from the operation performed by element 1D), as further described below with respect to the processing of the packets.

The packet-processing functions of the function elements within the decapsulation chains 112, 116 and encapsulation chains 114, 118 are preferably divided between the route processor 22 and the line card processors 24a, 24b in one of the following arrangements: (a) the entire function is processed in the route processor; (b) the entire function is processed in one of the line card processors; or (c) some parts within the function element are processed on the route processor and other parts are processed on the line card processor. Under arrangements (b) and (c), the line card processors 24a, 24bare more fully utilized, making more time available to the route processor 22 for performing tasks such as route calculations.

The chains 112, 114, 116, 118 may have elements added, deleted, or substituted based on changes in system configuration. Each element in a chain has no specific knowledge of the other elements in the chain. Thus, the chain can be modified by inserting elements into the chain without changing the existing elements. For example, an Ethernet address filter could be inserted before an IP decapsulation element, or a new compression element could be inserted at the beginning of an encapsulation chain. The chains allow new features to be introduced to the router 20 without changing existing code.

The chains are typically built during initialization, as described below with respect to the flowchart of FIG. 6. The chains may also be dynamically rebuilt upon a change of system configuration. Such changes typically come from a customer command line interface, however, in some cases there may be features that are configured remotely by a network management request or locally after a protocol negotiation. During initialization, the router's control software determines which network interfaces exist on the router. An interface descriptor block is created for each interface. Decapsulation and encapsulation elements are added to each interface according to the protocols available as determined by configuration information provided for each interface (e.g., read from a file or programmable memory). Once the chain for an interface is built, the interface is ready for packet processing. When a packet is received by an interface it is handed to a chain walker 58 and processed as described below.

The packet is processed by the chain walker 58 which walks through a chain, passing the packet to each element in the chain, until processing is completed, the chain is halted, or the packet is dropped (FIG. 4). Each element may also pass the packet to an external software or hardware function, or from one of the line card processors 24a, 24b to the route processor 22, or from the route processor 22 to one of the line card processors 24a, 24b. The passed packet may be returned to the next node in the chain, or not returned at all. FIG. 4 illustrates the chain walker 58 walking through a decapsulation chain 51 and an encapsulation chain 53. When a packet is received by the router 20 it is first passed to the chain walker 58. The chain walker 58 in turn retrieves a pointer to a demux element 59. In the example shown in FIG. 4, interface 61 is an Ethernet interface. Thus, demux element 59 performs an Ethernet decapsulation operation. The decapsulation chain comprises decryption element 60, decompression element 62, and IP switch 64. The demux element 59 returns a pointer to the decapsulation chain as indicated by dotted line 63a. This pointer then points to the decryption element 60 as shown at 63b. Decryption element 60 follows Ethernet decapsulation 59 as indicated by solid line 65. Each chain element returns to the chain walker 58 a pointer to the next chain element. The chain walker 58 then calls the next element in the chain.

After decapsulation, the router 20 prepares the packet for further transmission by encapsulating the packet in the desired protocol, assuming the packet is not intended for the router itself. Line 68 indicates separation of the decapsulation chain 51 from the encapsulation chain 53. The packet is passed from the IP switch 64 to the encapsulation chain associated with an intended output HDLC interface 70. The encapsulation chain includes a compression element 72, encryption element 74, and an HDLC encapsulation element 76.

Figure 5:
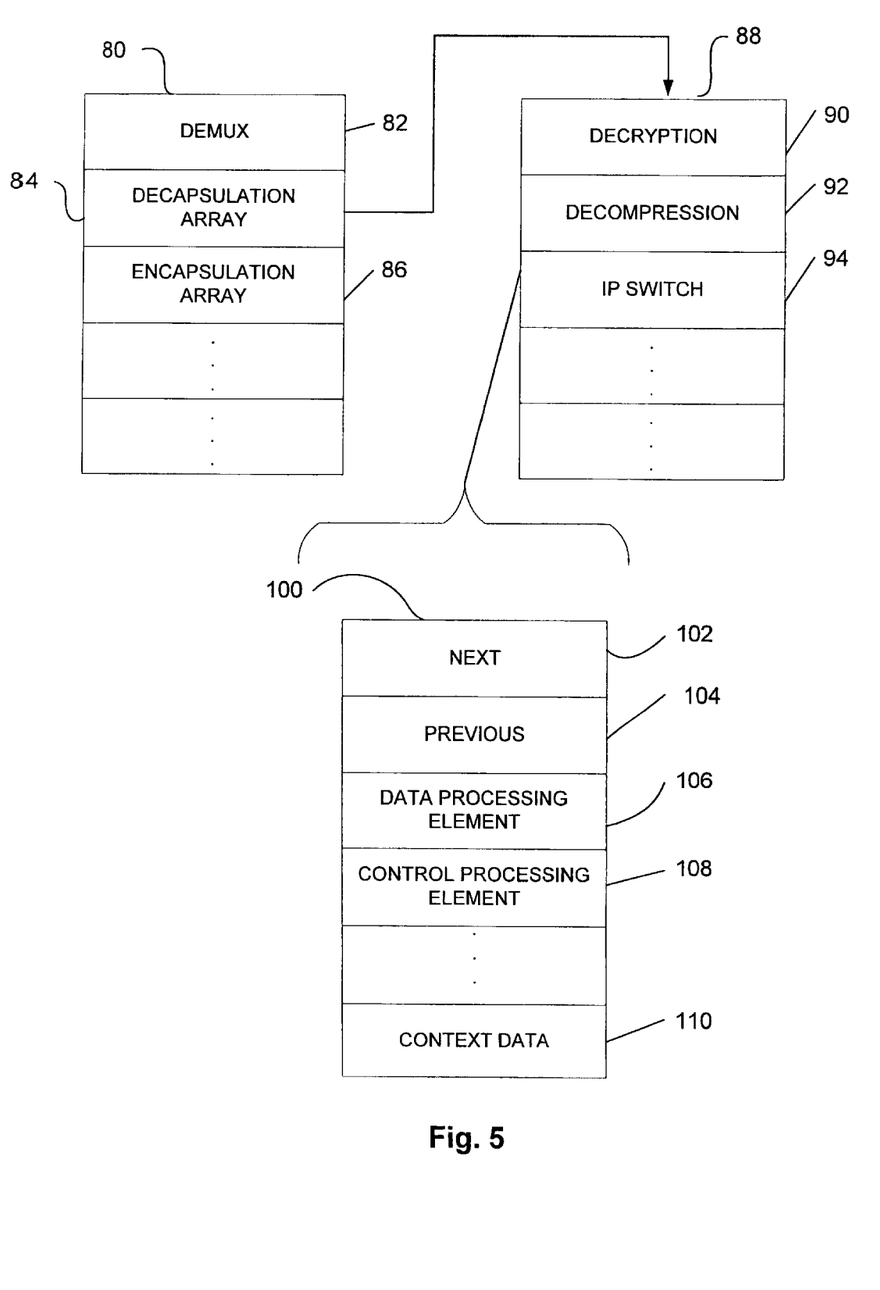
FIG. 5 is a schematic of data structures used to implement encapsulation and decapsulation chains used in the router of FIG. 1.

FIG. 5 illustrates data structures used to implement the decapsulation and encapsulation chains 51, 53 described above. A unique interface descriptor block 80 is defined for each interface. The interface descriptor block 80 includes a demux field 82, a decapsulation array pointer 84, and an encapsulation array pointer 86, for example. The decapsulation array pointer 84 points to a decapsulation array 88 having pointers 90, 92, 94 to various decapsulation chain elements (e.g., decryption, decompression, and IP switch). An expanded view of an element (node) is shown at 100. The element includes a next field 102 which points to the next element in the chain, a previous field 104 which points to the previous element in the chain, a data processing element pointer 106, and a control processing element pointer 108 which points to the actual processing elements. Context data 110 may also be contained within the element 100 to specify operation of the element during chain walking. For example, an input access control list (ACL) filter node would contain information describing the filtering to be used.

For packets entering the router 20 from an interface, the chain walker 58 typically starts with a demux element. While there can be any number of encapsulation and decapsulation elements chained together on an interface, there is typically only one demux element for each interface. For packets that are sourced by the route processor 22, the chain walk starts with the first encapsulation element. The individual nodes in a chain have no knowledge of the number of elements or types of protocols on a chain. Each element or node on the chain determines whether or not the chain walk continues based on its processing of the packet.

Figure 6:
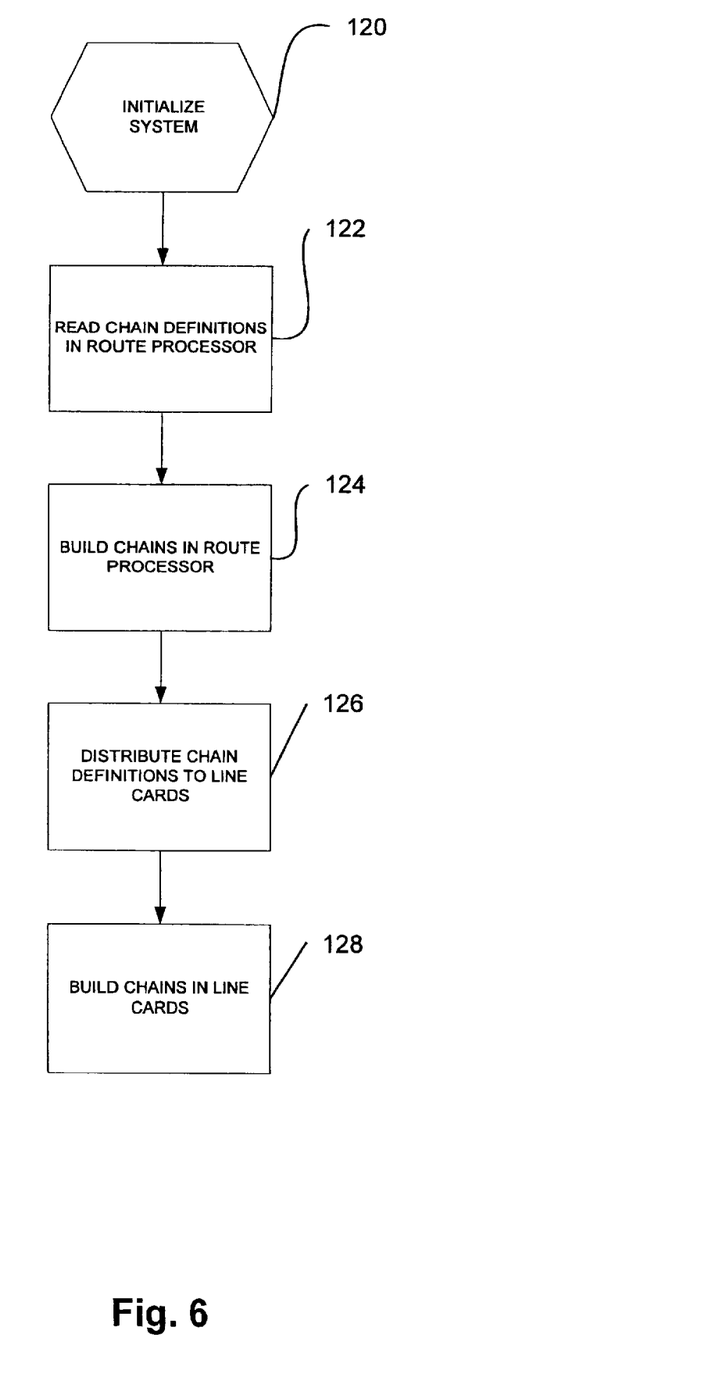
FIG. 6 is a flowchart illustrating a process used to build chains in the router of FIG. 1.

The flowchart of FIG. 6 illustrates a process for building chains 112, 114, 116, and 118 on the route processor 22 and line card processors 24a, 24b of the router 20 upon initialization or configuration change of the system (step 120) (FIGS. 1 and 6). The route processor 22 reads a list of chain definitions at step 122 and builds decapsulation chain 112 and encapsulation chain 114 at step 124. After chains 112 and 114 are built on the route processor 22, the route processor distributes the chain definitions to the line card processors 24a, 24b at step 126. The line cards then build decapsulation chain 116 and encapsulation chain 118 (step 128) which correspond to the decapsulation and encapsulation chains 112, 114, respectively, built on the route processor 22. The chains are preferably constructed one element at a time. Element 2D of chain 112 may be built at close to the same time as element 2D' of chain 116, for example. The rules used to build the chains on the route processor 20 and the line card processors 24a, 24b are preferably the same, however, the chain elements may be different depending on which functions are to be performed on the route processor and which are to be performed on the line cards. For example, if the packet-processing function of element 1D' is to be performed on the route processor 22 rather than the line card processor 24a, the operation performed by 1D' will be to pass the packet from the line card processor to the route processor so that the route processor can perform the function on the packet (FIG. 1). The operation performed by function element 1D of chain 112 on the route processor 22 will be the performance of the specific packet-processing function of the function element.

It is to be understood that the method for building chains and the configuration of the chains may be different than described herein without departing from the scope of the invention.

The router software includes code having an identifier which specifies which functions in the chains are to be performed on the line card processors 24a, 24b and which functions are to be passed to the route processor 22 for processing. The identifier is used when building the chains 112, 114, 116, 118 to define the operation to be performed by each function element. The route processor 22 and the line cards 24a, 24b may each include an IP access list that specifies which functions are to be performed on which processor. For example, IP routing may be done on the route processor 22 while IP switching is handled on the line card processors 24a, 24b. Certain functions may also be split between the route processor 22 and one of the line card processors 24a, 24b. In this case, the line card processor 24a, 24b and route processor 22 would together perform the function specified in the function element. An example of a function which may be shared between one of the line card processors 24a, 24b and the route processor 22 is IP switching. If the packet can be locally forwarded (from the line card) then the line card handles it, but if an adjacency is required, the packet may be forwarded to the route processor for more processing (ARP, etc.).

Figure 7:
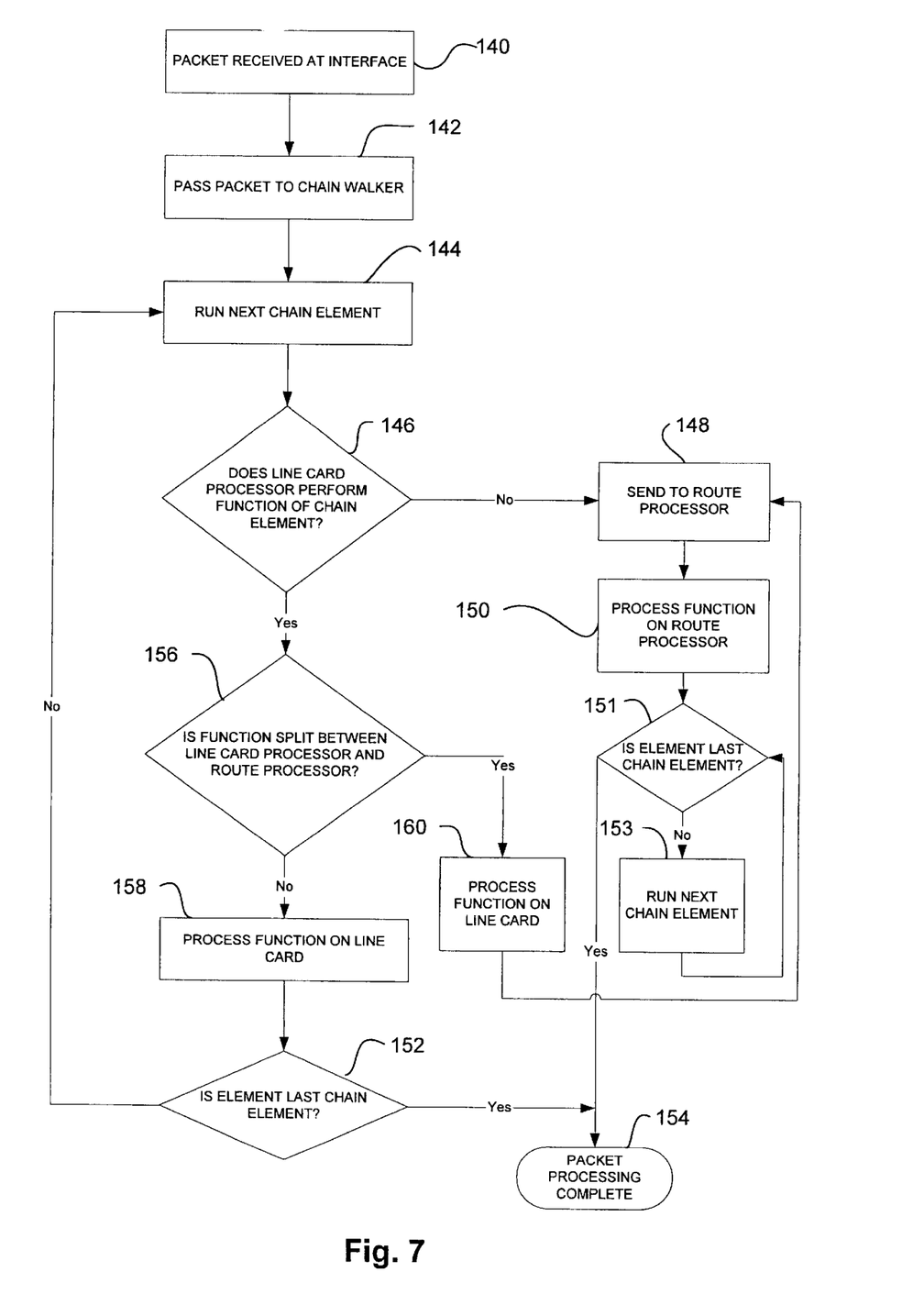
FIG. 7 is a flowchart illustrating packet processing in the router system of FIG. 1.

The flowchart of FIG. 7 illustrates the processing of a packet received at interface 25a of line card 24a (step 140). When the packet is received the interface data block for that specific interface is retrieved. A pointer to the chain is retrieved from the interface data block and passed to the chain walker 58 (FIG. 4). The chain walker 58 receives the packet and the pointer from the interface data block and executes the current chain element pointed to by the pointer received from the interface data block (step 144) (FIGS. 4 and 7). As the chain walker 58 executes the chain element, a decision is made at each function as to whether the function is to be performed on the line card processor 24a or passed to the route processor 22 for processing (step 146). If a function is to be performed on the route processor 22, the packet is passed to the route processor for processing (steps 148 and 150). Processing continues on the route processor 22 if there are additional chain elements (steps 151 and 153). If instead, the function is to be performed only by the line card, it remains on the line card for processing by the line card processor 24a (step 158). If the function is split between the line card processor 24a and route processor 22, the packet is transferred to the route processor for further processing (steps 156, 160, and 148). This process is repeated until there are no more chain elements (steps 151, 152 and 154). Preferably, once an element is processed on the route processor 22, processing continues on that processor to keep cross-card traffic to a minimum. However, processing may be returned to the line cards 24a, 24b, or another processor in the system, for example.

It will be observed from the foregoing that the router 20 of the present invention has many advantages. Since the line card processors 24a, 24b perform functions which were previously performed by the route processor 22, more CPU power is left in the route processor. Thus, routing calculations are performed more quickly. Further, processing for services such as keep alives can be performed on the line card allowing for uninterrupted operation during loss of the route processor 22, thus increasing reliability.

The above described methods may be implemented in a computer program product having computer codes that perform the various steps of the methods. The computer codes are preferably stored in a computer readable medium, such as CD-ROM, zip disk, floppy disk, tape, flash memory, system memory, hard drive, and data signal embodied in a carrier wave, such as over a network.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method for processing packets comprising:
   Building a primary chain of function elements on a primary processor, each element being operable to perform an operation on a packet and independent from the other elements of the chain;
   Sending a description of the primary chain function elements from the primary processor to a secondary processor;
   Building a secondary chain of function elements on the secondary processor based on the description of the primary chain of function elements, each of the function elements of the secondary chain corresponding to at least one of the function elements of the primary chain to form a function element pair;
   Selecting one of the primary processor, secondary processor, and combination of the primary and secondary processors to perform a packet-processing function of each of the elements, wherein the selection is based on an identifier associated with each of the function elements; and
   Processing the packet by walking through the elements on at least one of the primary and secondary chains.

2. The method of claim 1 wherein building primary and secondary chains comprises defining a common set of rules to build the chains.

3. The method of claim 1 wherein at least one pair of corresponding function elements are configured to perform different operations.

4. The method of claim 3 wherein the operation of one of the elements of the pair of function elements comprises passing the packet from the secondary processor to the primary processor.

5. The method of claim 4 wherein the operation of the other of the elements comprises performing the packet-processing function.

6. The method of claim 1 wherein selecting one or a combination of the processors comprises specifying within each function element the processor or combination of processors to perform the packet-processing function.

7. The method of claim 1 wherein building primary and secondary chains comprises building a decapsulation chain and an encapsulation chain associated with an interface.

8. The method of claim 1 wherein the primary processor is a route processor and the secondary processor is located on a line card.

9. A router for a computer network comprising:
   A primary processor having a first chain generator operable to generate a primary chain of function elements in a linked configuration, each element being capable of performing an operation on a packet; and
   A secondary processor having a second chain generator operable to generate a secondary chain of function elements in a linked configuration;
   Wherein each of the function elements of the primary chain corresponds to one of the function elements of the secondary chain to form a pair of function elements, at least one function element of each pair being configured to perform a packet-processing function; and
   Wherein the primary processor is configured to send a description of the primary chain function elements from the primary processor to the secondary processor for use in generating the secondary chain of function elements; and
   Wherein selecting one of the primary processor, secondary processor, and combination of the primary and secondary processors to perform a packet-processing function of each of the elements is based on an identifier associated with each of the function elements.

10. The router of claim 9 wherein the primary processor is a route processor and the secondary processor is a line card processor.

11. The router of claim 9 further comprising a chain walker configured to walk through the chain by executing elements within the chain.

12. The router of claim 9 wherein the operation of at least one function element of each of the function element pairs comprises passing the packet to the other of the primary and secondary processors.

13. The router of claim 9 wherein both function elements of one of the function element pairs are configured to perform the packet-processing function.

14. The router of claim 9 wherein the primary chain is an encapsulation chain.

15. The router of claim 9 wherein the primary chain is a decapsulation chain.

16. The router of claim 9 further comprising a plurality of interfaces, each interface being associated with a decapsulation chain and an encapsulation chain.

17. A computer program product for processing packets, comprising:
   computer code that builds a primary chain of function elements on a primary processor, each element being operable to perform an operation on a packet;
   computer code that sends a description of the primary chain function elements from the primary processor to a secondary processor;
   computer code that builds a secondary chain of function elements on a the secondary processor based on the description of the primary chain function elements;

computer codes that selects one of the primary processor, secondary processor, and combination of the primary and secondary processors to perform a packet-processing function of each of the elements, wherein the selection is based on an identifier associated with each of the function elements;

computer code that processes the packet by walking through the elements on at least one of the primary and secondary chains; and a computer readable medium that stores the computer codes.

18. The computer program product of claim 17 further comprising computer code that specifies within each function element the processor or combination of processors to perform the packet-processing function.

19. The computer program product of claim 17 wherein the computer readable medium is selected from the group consisting of CD-ROM, zip disk, floppy disk, tape, flash memory, system memory, hard drive, and data signal embodied in a carrier wave.

20. The method of claim 1 wherein an operation of one of the function elements of the secondary chain is to pass a packet to the corresponding function element on the primary processor so that the primary processor can perform the operation of the primary chain function element on the packet.

21. The method of claim 1 further comprising inserting a new function element into the primary chain without modifying existing function elements.

22. The method of claim 1 further comprising removing one of the function elements from the primary chain without modifying remaining function elements.

23. The method of claim 22 further comprising removing the corresponding function element in the secondary chain.

24. The method of claim 1 further comprising replacing one of the function elements of the primary chain without modifying the other function elements of the primary chain.

25. The method of claim 1 further comprising dynamically rebuilding at least one of the primary and secondary chains following a change to system configuration.

26. The method of claim 1 wherein processing the packet comprises walking through the corresponding elements on the primary and secondary chains of the primary and secondary processors.

27. The method of claim 1 wherein building primary and secondary chains comprises dynamically chaining together chain elements as needed at run time.

28. The router of claim 9 wherein at least one of the primary and secondary processors comprise an access list specifying functions to be performed on each of the processors.

29. The router of claim 9 wherein the primary processor is configured to perform routing and the secondary processor is configured to perform switching.

30. The router of claim 9 wherein the primary and secondary processors share a function.

31. The router of claim 30 wherein the primary processor forwards the packet if an adjacency is required.

32. The router of claim 30 wherein the secondary processor forwards the packet if the packet can be locally forwarded.

33. The method of claim 1 wherein the primary chain and secondary chain are each associated with an interface.

* * * * *